(12) United States Patent
Wong

(10) Patent No.: US 8,307,760 B2
(45) Date of Patent: Nov. 13, 2012

(54) DEVICE FOR ROASTING FOWL

(75) Inventor: Alex S. W. Wong, West Hong Kong (HK)

(73) Assignee: King's Flair Development Ltd., West Hong Kong (HK)

(*) Notice: Subject to any disclaimer, the term of this patent is extended or adjusted under 35 U.S.C. 154(b) by 430 days.

(21) Appl. No.: 12/715,312

(22) Filed: Mar. 1, 2010

(65) Prior Publication Data

US 2011/0209627 A1 Sep. 1, 2011

(51) Int. Cl.
*A47J 43/18* (2006.01)
*A47J 37/04* (2006.01)

(52) U.S. Cl. ............. 99/421 V; 99/419; 99/345; 99/347; 99/446

(58) Field of Classification Search ................ 99/421 V, 99/419, 345, 347, 446
See application file for complete search history.

(56) References Cited

U.S. PATENT DOCUMENTS

| | | | | |
|---|---|---|---|---|
| 4,709,626 A | * | 12/1987 | Hamlyn | 99/426 |
| 5,069,117 A | * | 12/1991 | Schlessel | 99/419 |
| 5,106,642 A | * | 4/1992 | Ciofalo | 426/509 |
| 5,842,409 A | * | 12/1998 | Loffler et al. | 99/421 V |
| 6,119,588 A | * | 9/2000 | Tiemann | 99/426 |
| 2006/0266227 A1 | * | 11/2006 | Britt et al. | 99/426 |
| 2007/0181006 A1 | * | 8/2007 | Measom | 99/345 |

* cited by examiner

*Primary Examiner* — Benjamin Layno
(74) *Attorney, Agent, or Firm* — McNeely, Hare & War LLP; Kevin J. McNeely

(57) ABSTRACT

A device for roasting fowl includes a base pan shaped to have a first supporting surface and a second supporting surface; an insert extending vertically from the first support surface of the base pan for mounting the fowl; wherein the first supporting surface of the base pan rests in a cooking apparatus to allow for roasting of the fowl in a vertical manner, and the second supporting surface of the base pan rests in the cooking apparatus to allow for roasting of the fowl in a horizontal manner.

11 Claims, 4 Drawing Sheets

DEVICE FOR ROASTING FOWL

FIELD OF THE INVENTION

This invention relates generally to the field of roasting device, and more particularly, to a device for roasting fowl which allows for both vertical and horizontal roasting of the fowl in a cooking apparatus.

BACKGROUND OF THE INVENTION

Various devices for roasting fowl are well-known in the art, which are able to mount the fowl and rest on an oven, a backyard grill, or a similar cooking apparatus commonly available in the market. A common feature of this type of devices is that the devices comprise an upward-standing element inserted into the interior body cavity of the fowl, such that the fowl is mounted in an upright manner during the process of roasting. By doing this, the fowl is roasting vertically only. Another disadvantage of these vertical devices is that the fowl of relatively large size cannot be mounted and supported properly and firmly for roasting even the size of the fowl is able to be received in the chamber of the cooking apparatus, due to the fact that the chamber of the cooking apparatus usually has a width larger than a height thereof. This may hinder the vertical roasting of the fowl of large size.

A still disadvantage of these vertical devices is that upward-standing element is not dimensioned so as to snugly fit into the interior body cavity of the fowl, and in general, the upward-standing element is about 12 cm or below. This results in slow heat transfer to the fowl due to the interior body cavity of the fowl is not in a full contact with the upward-standing element. Therefore, roasting of the fowl in these devices requires more roasting time.

Although a variety of devices for roasting fowl exist in the prior art to meet their respective purposes, these devices do not allow for roasting fowl in both vertical and horizontal manner in a cooking apparatus, and are not thermally effective sufficiently. Therefore, the invention entails the task of creating a simple and heat-effective device for roasting fowl, which is able to surely and stably rest on a cooking apparatus to roast the fowls of different sizes depending on the actual needs, and quicken the heating process of the fowl by providing an improved heat transfer, thereby shortening the roasting time.

SUMMARY

The present invention has been developed to fulfill the needs noted above and therefore has a principle object of the provision of a device for roasting fowl which can rest on an cooking apparatus to allow for vertical and horizontal roasting of the fowl.

Another object of the invention is to provide a device for roasting fowl which has better heat transfer from the device to the fowl.

These and other objects and advantages of the invention are satisfied by providing a device for roasting fowl, comprising:

a base pan shaped to have a first supporting surface and a second supporting surface;

an insert extending vertically from the first support surface of the base pan for mounting the fowl;

wherein the first supporting surface of the base pan rests in a cooking apparatus to allow for roasting of the fowl in a vertical manner, and the second supporting surface of the base pan rests in the cooking apparatus to allow for roasting of the fowl in a horizontal manner.

In one preferred embodiment, a support is pivotally attached to a circumferential flange of the base pan to assist in the stability of the device when the fowl is roasting in a horizontal manner. The support is preferably a "U" shaped member made of metal wire. The "U" shaped member has advantageously two ends pivotally attached to the circumferential flange, and is allowed to be pivoted to a retracted position where the "U" shaped member is positioned below the circumferential flange and substantially parallel to the first supporting surface, and to a unfoldable position where the "U" shaped member and the second supporting surface are substantially in a same plane to rest on the cooking apparatus.

In a specific embodiment of the invention, the first and second supporting surfaces are elliptic and adjoin at an angle to form the base pan. Preferably, the first and second supporting surfaces adjoin at a right angle or an obtuse angle.

In another embodiment of the invention, the insert is in the form of a round-head conical member, and is constructed integral with the base pan. Preferably, the insert is about 15 cm or above in length, and more preferably, the insert is about 15-20 cm in length.

According to the invention, the base pan and the insert are made of heat-conducting material, such as aluminum, on which a nonstick coating is coated.

In contrast to the devices for roasting fowl available in the prior art, the device of the invention has a base pan which is shaped to mount the fowl vertically and horizontally, allowing for roasting fowls of large size. Also, the base ban and the insert are constructed as one piece and designed such that the heat transfer from the base pan to the insert and then to the fowl is improved. Therefore, the device for roasting fowl according to the invention is relatively simple in configuration, low in cost and easy in manipulation, and the roasting time is significantly reduced.

To have a better understanding of the invention reference is made to the following detailed description of the invention and embodiments thereof in conjunction with the accompanying drawings.

BRIEF DESCRIPTION OF THE DRAWINGS

In the various figures of the drawings, like reference numbers are used to designate like parts.

DETAILED DESCRIPTION

Figure 1A:
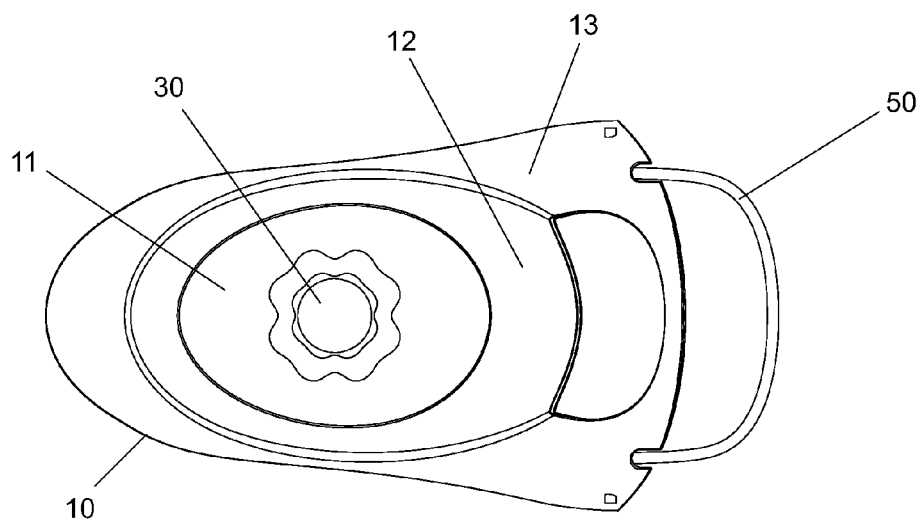
FIG. 1a is a top view of a device for roasting fowl constructed in accordance with an embodiment of the invention, with a support is pivoted to a position in use.
Figure 1B:
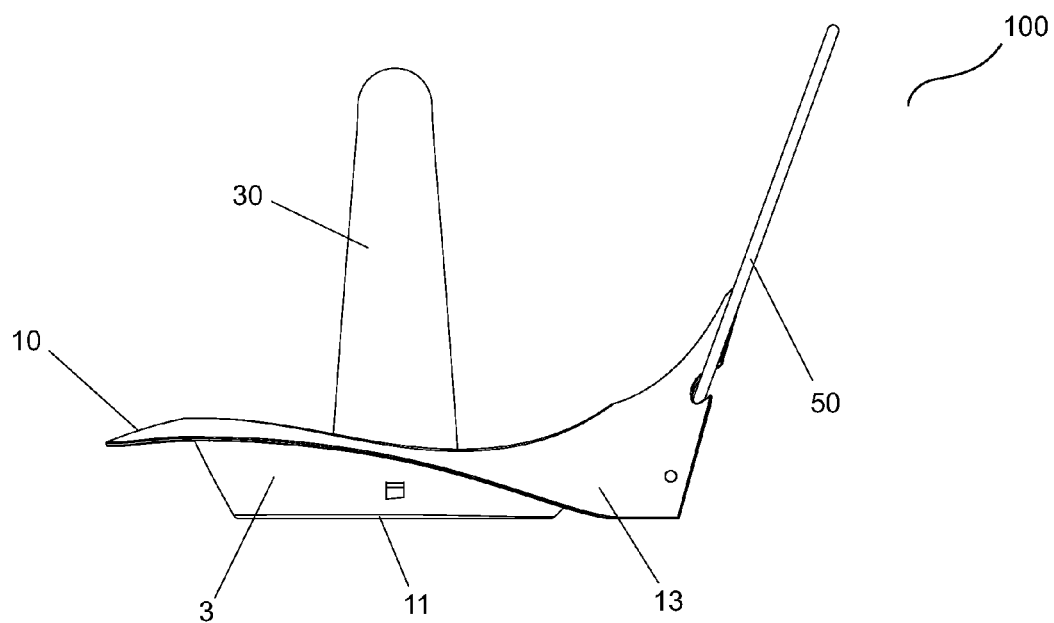
FIG. 1b is a front elevation view of the device for roasting fowl shown in FIG. 1.
Figure 1C:
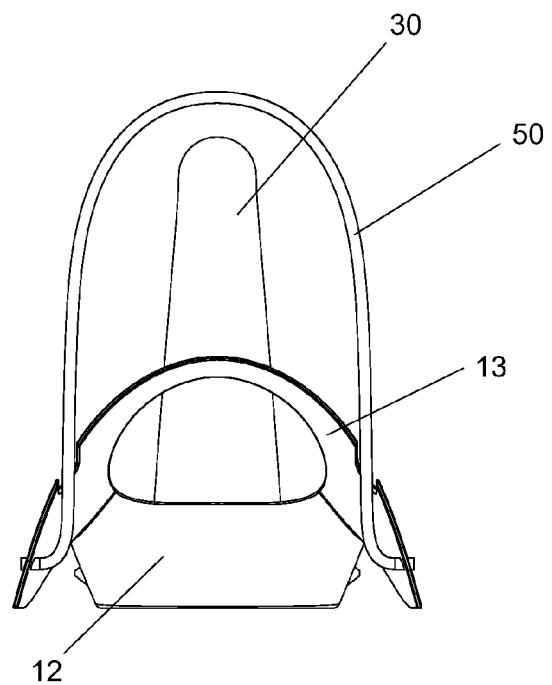
FIG. 1c is a side view of the device for roasting fowl shown in FIG. 1.

While this invention is illustrated and described in preferred embodiments, the device for roasting fowl may be produced in many different configurations, sizes, forms and materials.

Referring now to the drawings, FIGS. 1a to 1c and FIG. 2 provide a device for roasting fowl 100 constructed consistent with a preferred embodiment of the present invention. In this embodiment, the device for roasting fowl 100 comprises a base pan 10, an insert 30, and a support 50 which is pivotally attached to the base pan 10.

The base pan 10 may be of any size, shape and configuration, provided that the base pan 10 allows for mounting of the fowl in both vertical and horizontal manner. In this embodiment, the base pan 10 is made of aluminum, and has a first supporting surface 11 which is substantially elliptical flat, and a second supporting surface 12 which is substantially elliptical flat. The first and second supporting surfaces 11, 12 adjoin at about a right angle such that the first supporting surface 11 provides a first position where the fowl is roasting vertically, and the second supporting surface 12 provides a second position where the fowl is roasting horizontally. According to the invention, the first and second supporting surfaces 11, 12 may adjoin at a right angle or an obtuse angle. It should be understood that the base pan 10 can be formed into various shapes, such as a rectangular shape, a round shape, a polygonal shape, or the like, while the first and second supporting surfaces can be non-planar. The base pan 10 further comprises a circumferential flange 13 extending from the circumference formed by adjoining the first and second supporting surfaces 11, 12 together. The circumferential flange 13 has two opposite through holes into which the support 50 is pivotally inserted, this will be discussed hereinbelow.

The insert 30 extends upward from a central portion of the first supporting surface 11 of the base pan. It would be noted that the insert 30 may extends upward from a point of the first supporting surface, which point is in favour of the stability of the device 100. The insert 30 is in the form of a round-head conical member, and is about 18-20 cm in length. This length allows for the snug insertion of the insert 30 into the entire interior body cavity of the large fowl, such as a turkey or a relatively large bird, facilitating the heating of the fowl. Similarly, the insert 30 can be formed into varied forms, for example, the insert 30 can be in the form of a column or a rod provided with or without an enlarged upper portion. Although the insert 30 may be mounted on the base pan by any type of connecting means known in the art, it is preferred that they are constructed as one piece according to the invention, in order to provide better heat transfer along the path of the base pan 10, the insert 30 and the fowl. The insert 30 and the base pan 10 may be formed integrally by injection molding, and advantageously have a nonstick coating thereon.

The support 50 is a "U" shaped member made of metal wire in this embodiment, which has two ends 51, 52 inserted pivotally into the through holes of the circumferential flange 13, such that the "U" shaped member is allowed to be pivoted to a retracted position where the "U" shaped member is positioned below the circumferential flange 13 and substantially parallel to the first supporting surface 11 when in not use, and to a unfoldable position where the "U" shaped member and the second supporting surface 12 are substantially in a same horizontal plane to rest on the cooking apparatus when in use, as can be best seen in FIG. 4. The "U" shaped member assists to support firmly the base pan when the fowl of large size mounted on the insert is roasting in a horizontal manner. It would be readily apparent to a person skilled in the art that the support 50 can also be formed as a plate, a pan or the like. Optionally, a tin or aluminum tray may be arranged on the "U" shaped member to act as a drip pan during the horizontal roasting process.

Figure 2:
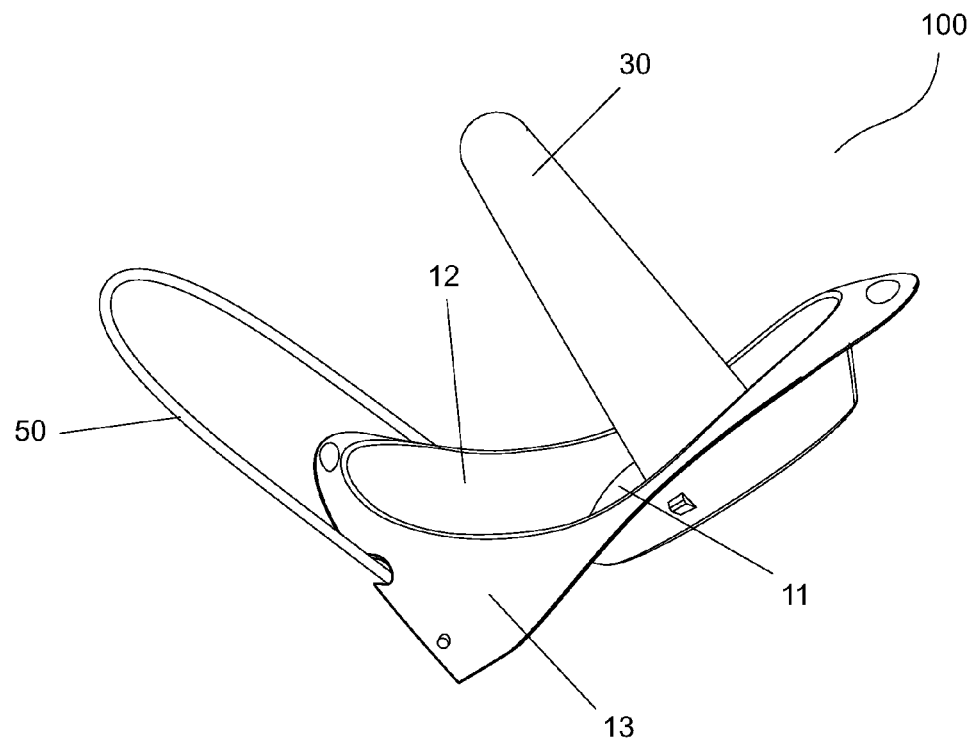
FIG. 2 is a perspective view of the device for roasting fowl shown in FIG. 1.

FIG. 2 illustrates a perspective view of the device according to the invention. As can be seen, two openings are provided on opposite ends of the circumferential flange 13 of the base pan 10, providing the ease of manually holding the device.

Figure 3:
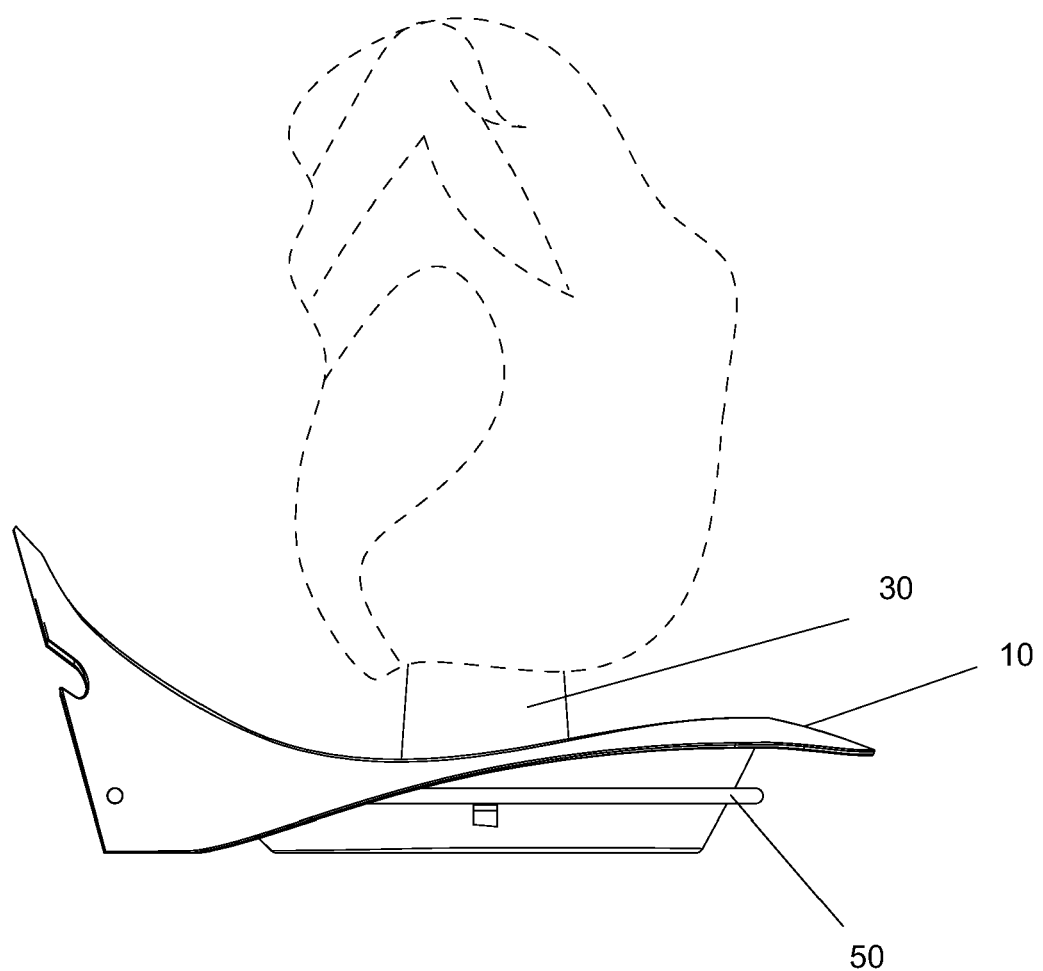
FIG. 3 is a perspective view of the device for roasting fowl shown in FIG. 1, illustrating that the device with the chicken mounted on the insert rests in a vertical manner.
Figure 4:
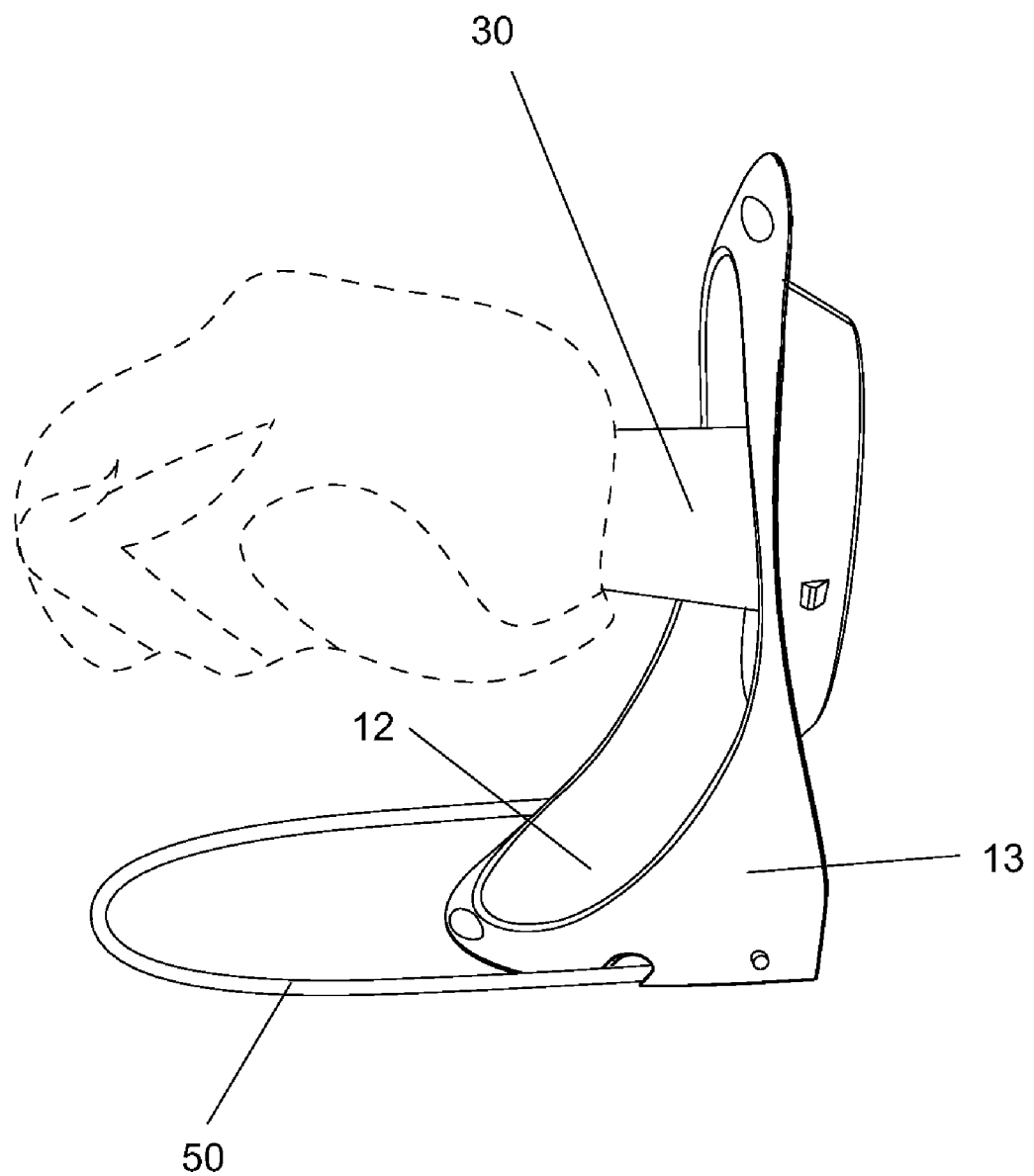
FIG. 4 is a perspective view of the device for roasting fowl shown in FIG. 1, illustrating that the device with the chicken mounted on the insert rests in a horizontal manner.

FIGS. 3 and 4 illustrate respectively a perspective view of the device 100 with the chicken mounted on the insert 30 in vertical and horizontal manners, allowing for vertical and horizontal roasting according to the actual requirements. As shown in these figures, the insert is long enough to be inserted into the entire body cavity of the chicken, and the "U" shaped member 50 is pivoted to the unfoldable position to firmly rest together with the second supporting surface 12 on a tray. In this embodiment, vertical and horizontal roasting of the chicken can be alternated if the device 100 is rotated by about 90°.

According to the invention, the device 100 may be made of a heat-conductive material, such as aluminum, cast iron, stainless steel or the like. Preferably, the device is sprayed with a nonstick coating for the ease of cooking and cleaning. The base pan 10 and the insert 30 may be made as one piece by injection molding, and the "U" shaped member may be formed by bending and polishing a piece of metal wire.

As discussed above, the device for roasting fowl according to the invention allows for roasting the fowl vertically and horizontally, depending on the actual needs. For the vertical roasting of the fowl such as chicken, the first support surface 11 of the base pan 10 is made to rest on the cooking apparatus, the second support surface 12 of the base pan 10 is made to rest on the cooking apparatus for the purpose of horizontal roasting of the fowl, and if necessary, the "U" shaped member is pivoted to the unfoldable position to assist the stability of the device during the process of the horizontal roasting.

Another feature of the device 100 according to the invention is that the insert has a length ranging 15-20 cm and constructed integral with the base pan. This length and the integral construction with the base pan enable the insertion of the insert into the entire body cavity of the fowl and improves the heat transfer from the base pan to the insert and then to the fowl. It has already been found that the heating process of the fowl can be quickened by about 30% and the roasting time can be reduced by about 25%.

The invention thus provides a device for roasting fowl which is a simple design and allows for roasting the fowl vertically and horizontally.

While the embodiments described herein are intended as an exemplary device for roasting fowl, it will be appreciated by those skilled in the art that the present invention is not limited to the embodiments illustrated. Those skilled in the art will envision many other possible variations and modifications by means of the skilled person's common knowledge without departing from the scope of the invention, however, such variations and modifications should fall into the scope of this invention.

What is claimed is:

1. A device for roasting fowl, comprising:
   a base pan shaped to have a first supporting surface and a second supporting surface;
   an insert extending vertically from the first support surface of the base pan for mounting the fowl;
   wherein the first supporting surface of the base pan rests in a cooking apparatus to allow for roasting of the fowl in a vertical manner, and the second supporting surface of the base pan rests in the cooking apparatus to allow for roasting of the fowl in a horizontal manner.

2. The device for roasting fowl as claimed in claim 1, wherein a support is pivotally attached to a circumferential flange of the base pan to assist in the stability of the device when the fowl is roasting in a horizontal manner.

3. The device for roasting fowl as claimed in claim 2, wherein the support is a "U" shaped member.

4. The device for roasting fowl as claimed in claim 3, wherein the "U" shaped member has two ends pivotally attached to the circumferential flange, and is allowed to be pivoted to a retracted position where the "U" shaped member is positioned below the circumferential flange and substantially parallel to the first supporting surface, and to a unfoldable position where the "U" shaped member and the second supporting surface are substantially in a same plane to rest on the cooking apparatus.

5. The device for roasting fowl as claimed in claim 1, wherein the first and second supporting surfaces are elliptic and adjoin at an angle to form the base pan.

6. The device for roasting fowl as claimed in claim 5, wherein the first and second supporting surfaces adjoin at a right angle or an obtuse angle.

7. The device for roasting fowl as claimed in claim 1, wherein the insert is in the form of a round-head conical member.

8. The device for roasting fowl as claimed in claim 1, wherein the insert is constructed integral with the base pan by injection molding.

9. The device for roasting fowl as claimed in claim 1, wherein the base pan and the insert are made of aluminum on which a nonstick coating is coated.

10. The device for roasting fowl as claimed in claim 1, wherein the insert is about 15 cm or above in length.

11. The device for roasting fowl as claimed in claim 1, wherein the insert is about 15-20 cm in length.

\* \* \* \* \*